L. H. PERLMAN.
WHEEL.
APPLICATION FILED MAR. 16, 1909.
1,206,138.
Patented Nov. 28, 1916
2 SHEETS—SHEET 2.

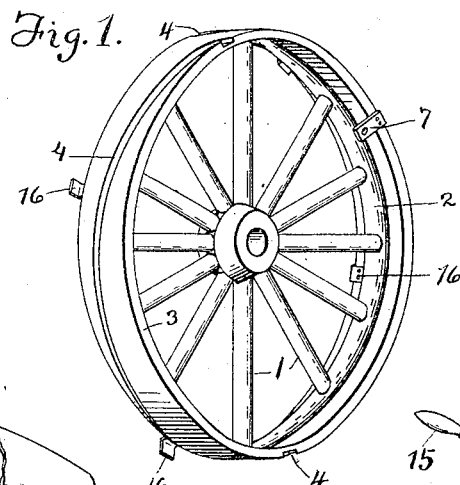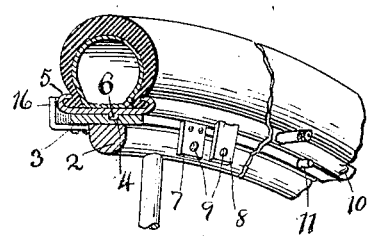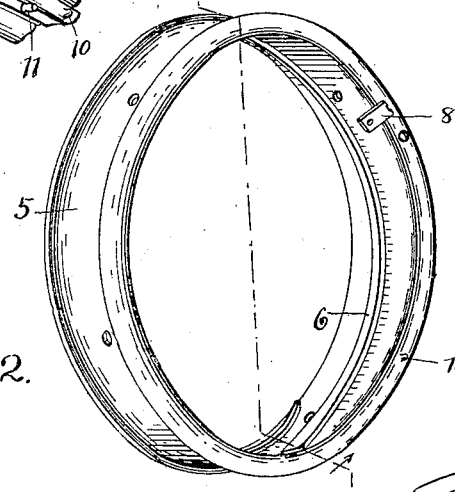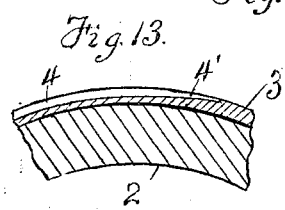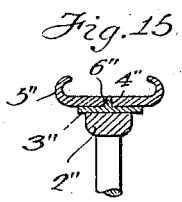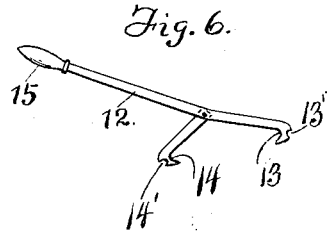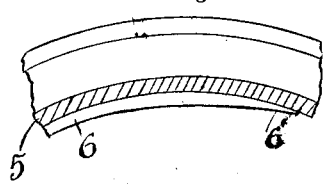

Fig. 5ᵃ. 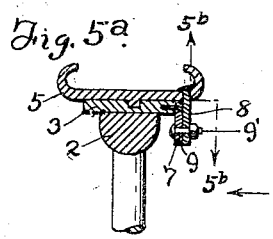
Fig. 5ᵇ. 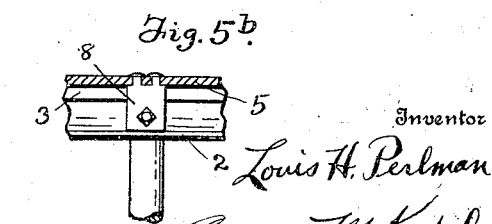
Witnesses
Stuart Hilder.
O. A. Kitchin.
Inventor
Louis H. Perlman
By Edgar M. Kitchin
his Attorney

UNITED STATES PATENT OFFICE.

LOUIS H. PERLMAN, OF NEW YORK, N. Y.

WHEEL.

1,206,138.

Specification of Letters Patent.

Patented Nov. 28, 1916.

Application filed March 16, 1909. Serial No. 483,815.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in wheels of the demountable rim type, and more particularly to means for enabling and facilitating quick and ready application of the demountable rim to and removal thereof from the fixed rim of a wheel while carrying a shoe either in an inflated or deflated condition.

An object in view is the provision, when the demountable rim is on the fixed rim, of a continuous circumferential contact between the rims, and the consequent equal distribution of strain.

A further object is the provision of means for affording a snug fit and an intimate contact between the outer face of the fixed rim and the inner face of the demountable rim, while allowing the demountable rim to be quickly and easily detached.

With these and further objects in view, as will be in part hereinafter stated and in part become apparent, the invention comprises certain novel constructions, combinations and arrangements of parts as hereinafter disclosed and claimed.

Figure 3:
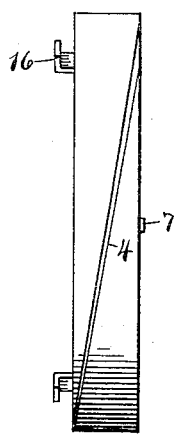
Figure 7:
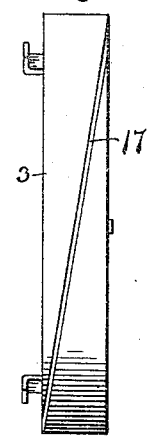
Figure 9:
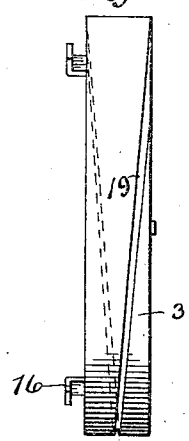
Figure 11:
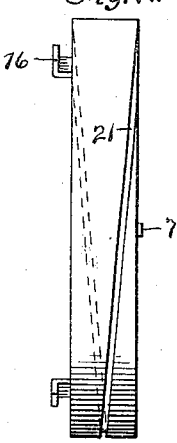
Figure 4:
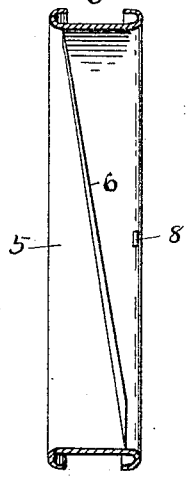
Figure 8:
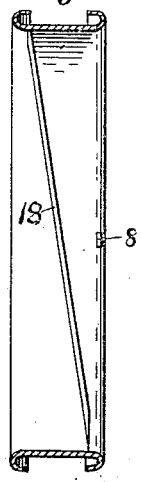
Figure 10:
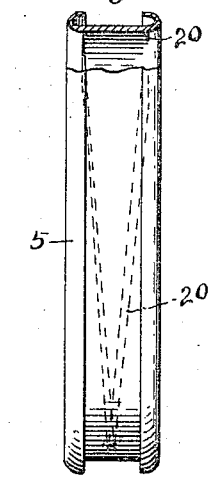
Figure 12:
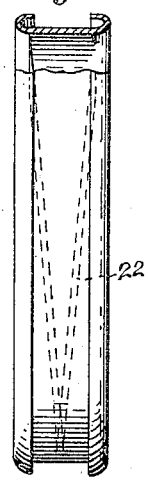

In the accompanying drawing, Figure 1 is a perspective view of a wheel illustrating an embodiment of the invention, the demountable rim being removed. Fig. 2 is a similar view of the demountable rim detached. Fig. 3 is an edge view of the parts seen in Fig. 1. Fig. 4 is a transverse section taken approximately on the plane indicated by line 4, 4 of Fig. 2. Fig. 5 is a fragmentary cross-sectional perspective view through the parts assembled. Fig. 5ᵃ is a similar cross section. Fig. 5ᵇ is a vertical section on the line 5ᵇ, 5ᵇ of Fig. 5ᵃ. Fig. 6 is a detail view of the rim shifting tool. Figs. 7 and 8 are similar views respectively to Figs. 3 and 4 of a modified embodiment. Figs. 9 and 10 are edge views of a modified embodiment of the wheel and demountable rim respectively, parts being broken away in Fig. 10. Figs. 11 and 12 are similar views of a further embodiment. Figs. 13 and 14 are detail fragmentary sections respectively illustrating the terminal ends of the respective rims. Fig. 15 is a transverse, vertical section through a modified arrangement showing the reverse relation of the male and female threads.

Referring to the drawings by numerals, 1 indicates a wheel having the usual wood felly 2 and fixed rim 3, the latter being transversely flat and having a smooth outer face or periphery, except for female threads of grooves 4, 4 formed therein. Each thread 4 extends for approximately one-half the periphery of the rim, and one thread begins on approximately the same transverse line of the rim as the termination of the other thread, the terminal end of each thread 4 being preferably spaced from the beginning end of the other thread approximately for the width of the rim.

In practice, the rim 5 fits snugly upon and has a bearing contact with the periphery of rim 3 throughout the circumference thereof, and the inner face of rim 5 is transversely flat and smooth, except for male threads 6, 6, corresponding to threads 4, 4, and adapted when the parts are assembled to lie therein. The rim 5 is adapted to be applied to the rim 3 by being caused to approach the same bodily laterally until the beginning ends of threads 6 are in position to enter threads 4, whereupon rim 5 is given a one-half rotation, the wheel 1 and rim 3 being held against movement by the brake or otherwise.

As the rotation is being completed the rim 5 will be moved laterally upon rim 3, and when entirely thereon will firmly engage the same at all points. Threads 5 and 6 may be of any type preferred, but preferably increase in width from their beginning end to their terminal end, that is to say, each thread tapers from its terminal to its point of beginning, so that the threading action may be easily and freely accomplished with no binding of the parts until the rim is in place, and then the snug fit of the threads forms a lock against further onward rotation. Obviously, in operation the wheel will be set for causing the drive to tend to thread the rim 5 farther on rim 3, and liability of separatiton of the rims is thus obviated, except in backing.

It is to be noted that the threads form a continuous, rigid engagement preventing any bodily lateral movement of the rim 5 except such as may result from rotation of the rim 5 independently of rim 3, so that to prevent separation of the rims when backing, or under any circumstances, it is only necessary to lock the rims against independent rotation. This may be accomplished in numerous ways, but for the purpose of illustration I have shown a depending lug or block 7 fixed to the rim 3, and a corresponding block 8 fixed to and depending from the outside of rim 5. Block 8 may be secured by means of lugs passed through apertures in rim 5 and suitably swaged. Blocks 7 and 8 are apertured at 9, and when the rim 5 is in the proper position on the rim 3, the apertures 9 register, and a bolt 9' is passed therethrough which effectually prevents independent rotary movement of the rims. Of course, as many pairs of blocks 7 and 8 may be provided as desired, but as there is only a minimum strain to be taken up one pair will usually be sufficient.

Usually in the assembling of the rims, the rim 5 will be readily and easily moved up to the final position, but owing to heating of rim 3 or from other cause if the final movement is found to require more force than may readily be applied by the hands of the operator, an instrument 12, as illustrated in Fig. 6, may be utilized. A lug or projection 10 is formed at the outside of rim 5, and a corresponding lug 11 similarly projects from the rim 3, and the operator, in applying rim 5 when extra force is required to bring the blocks 7 and 8 into position, applies hook 13 of instrument 12 to lug 10, and hook 14 to lug 11, and lifts upwardly on the handle 15, the pivoted arm carrying the hook 14 being thus caused to approach the main or lever portion of the instrument, and hooks 13 and 14 with the lugs engaged thereby being forced closer together until apertures 9 are in alinement. If in taking off the rim 5 extra force is required, the outer hooks 13' and 14' are respectively applied to the lugs 10 and 11, and handle 15 is depressed, bolt 9' having been previously removed, and thus the rim 5 is started off. When once started, the remaining movement required for removal of the rim will be free, and readily accomplished manually. Obviously the rim 5 may be of any construction desired so far as its connection with a shoe is concerned, except that the side valve must be employed, and I preferably provide for a detachable connection of the shoe with the rim, for instance, after the principle set forth in my co-pending application Serial No. 324,045, filed June 29, 1906.

While it is obvious that the rim 3 cannot move inwardly beyond the limit allowed by the tapered thread, as an extra precaution I propose to provide L-brackets 16 riveted or otherwise suitably secured on the inner side of the felly.

Obviously, while I have above set forth the male thread as on the demountable rim and the female thread as on the fixed rim, an inverse arrangement is clearly comprehended within the scope of the invention as indicated in Fig. 15, in which 2'' is the felly, 3'' the fixed rim, 5'' the demountable rim, and 6'' the male thread engaging female thread 4''.

The provision of means for preventing independent rotation of the rims insures against any lateral movement of one with respect to the other, and it is therefore obvious that instead of the tapered thread, I may utilize a straight thread, as seen at 17 and 18 in Figs. 7 and 8.

In Figs. 9 and 10 I have illustrated another obvious arrangement of the same invention, which consists in providing continuous threads 19 and 20 respectively on the fixed and demountable rims, the thread extending longitudinally and circumferentially of the respective part and being tapered if desired as indicated. The continuous formation of the thread may furthermore be of the ordinary type of thread instead of being tapered, as indicated at 21 and 22 respectively of the fixed and demountable rims seen in Figs. 11 and 12.

As indicated in Fig. 13, at 4', the thread 4 as it approaches its terminal end is preferably tapered outwardly, that is with respect to its thickness, this taper being additional to the longitudinal taper with respect to the width of the thread. The thread 6, as indicated at 6', correspondingly tapers in thickness in addition to the longitudinal taper as to its width, so that as the terminal or smaller end of the male thread approaches the corresponding end of the female thread, the parts will fit snugly together and wedge tightly in place, and at the same time it will be observed that the smaller end of the male thread will move easily and freely throughout the larger portions of the female thread, so that the thread action in applying the demountable rim to the fixed rim will be accomplished with but a minimum amount of friction.

What I claim is,—

1. In a wheel, the combination of a fixed rim, a rim designed to be detachably mounted thereon, and a thread connection between the rims, the terminal end of the female thread being tapered with respect to depth and the entering end of the male thread being correspondingly tapered.

2. In a wheel, the combination of a fixed rim, a rim designed to be detachably mounted thereon, and a thread connection between the detachable rim and fixed rim, tapering longitudinally with respect to its width and tapering with respect to its thickness at one end.

3. In a wheel, the combination of a fixed rim, a rim designed to be detachably mounted thereon, and a thread connection between the detachable rim and fixed rim, said threaded connection tapering longitudinally throughout its length with respect to its width, the male thread tapering with respect to its thickness at its entering end and the female thread correspondingly tapering with respect to its thickness at its terminal end.

In testimony whereof I affix my signature in presence of two witnesses.

LOUIS H. PERLMAN.

Witnesses:
 JOHN E. BRODSKY,
 C. S. TRECARTIN.